(12) United States Patent
Okano et al.

(10) Patent No.: US 9,502,774 B2
(45) Date of Patent: Nov. 22, 2016

(54) FOLDED DIPOLE ANTENNA AND RF TAG USING THE FOLDED DIPOLE ANTENNA

(75) Inventors: Yoji Okano, Otake (JP); Tetsuya Kimura, Otake (JP); Kazumi Yamamoto, Otake (JP); Takanori Doi, Otake (JP); Yoshiro Sato, Otake (JP)

(73) Assignee: TODA KOGYO CORPORATION, Hiroshima (JP)

(*) Notice: Subject to any disclaimer, the term of this patent is extended or adjusted under 35 U.S.C. 154(b) by 166 days.

(21) Appl. No.: 13/884,417

(22) PCT Filed: Nov. 10, 2011

(86) PCT No.: PCT/JP2011/075975
§ 371 (c)(1),
(2), (4) Date: Jun. 17, 2013

(87) PCT Pub. No.: WO2012/063913
PCT Pub. Date: May 18, 2012

(65) Prior Publication Data
US 2013/0265205 A1    Oct. 10, 2013

(30) Foreign Application Priority Data

Nov. 12, 2010 (JP) .................... 2010-253844

(51) Int. Cl.
*H01Q 9/16* (2006.01)
*H01Q 1/00* (2006.01)
*H01Q 9/26* (2006.01)
(Continued)

(52) U.S. Cl.
CPC ............ *H01Q 9/26* (2013.01); *G06K 19/0779* (2013.01); *H01Q 1/2208* (2013.01); *H01Q 1/2225* (2013.01); *H01Q 1/40* (2013.01); *H01Q 19/22* (2013.01)

(58) Field of Classification Search
CPC ...... H01Q 9/26; H01Q 9/285; H01Q 1/2225; H01Q 1/243; H01Q 23/00; H01Q 1/40; H01Q 19/22; H01Q 1/2208
See application file for complete search history.

(56) References Cited

U.S. PATENT DOCUMENTS 6,028,564 A * 2/2000 Duan ............... G06K 19/07786
340/572.7
6,781,556 B2 * 8/2004 Kojima et al. ................ 343/818
(Continued)

FOREIGN PATENT DOCUMENTS

JP    2000-278037    10/2000
JP    2002-222398    8/2002
(Continued)

OTHER PUBLICATIONS

International Search Report for PCT/JP2011/075975, mailed Jan. 31, 2012.

*Primary Examiner* — Trinh Dinh
(74) *Attorney, Agent, or Firm* — Nixon & Vanderhye P.C.

(57) ABSTRACT

The present invention relates to a folded dipole antenna comprising a magnetic material comprising a hexagonal Z-type ferrite and/or a hexagonal Y-type ferrite as a main component in which a radiation element and a reflection element each having a folded dipole structure are disposed, and an RF tag comprising the folded dipole antenna and an IC chip connected to the folded dipole antenna. The RF tag according to the present invention has a smaller size than that of the conventional RF tags and is not susceptible to adverse influence from ambient environments, and can be operated at an UHF band or surrounding frequency bands thereof.

7 Claims, 1 Drawing Sheet

(51) Int. Cl.
*G06K 19/077* (2006.01)
*H01Q 1/22* (2006.01)
*H01Q 1/40* (2006.01)
*H01Q 19/22* (2006.01)

(56) References Cited

U.S. PATENT DOCUMENTS

| | | | | |
|---|---|---|---|---|
| 7,323,977 | B2* | 1/2008 | Kodukula et al. | 340/505 |
| 7,750,864 | B2* | 7/2010 | Hilgers | G06K 19/07749 343/700 MS |
| 2002/0140539 | A1* | 10/2002 | Takashima et al. | 336/200 |
| 2007/0290944 | A1* | 12/2007 | Takaki et al. | 343/873 |
| 2010/0090015 | A1* | 4/2010 | Sakama | 235/492 |
| 2010/0097191 | A1* | 4/2010 | Yamagajo | H01Q 1/2225 340/10.1 |
| 2011/0115685 | A1* | 5/2011 | Chang | 343/793 |
| 2012/0326937 | A1* | 12/2012 | Oksanen et al. | 343/787 |

FOREIGN PATENT DOCUMENTS

| | | |
|---|---|---|
| JP | 2005-165462 | 6/2005 |
| JP | 2009-200859 | 9/2009 |

\* cited by examiner

FOLDED DIPOLE ANTENNA AND RF TAG USING THE FOLDED DIPOLE ANTENNA

This application is the U.S. national phase of International Application No. PCT/JP2011/075975, filed 10 Nov. 2011, which designated the U.S. and claims priority to Japan Application No. 2010-253844, filed 12 Nov. 2010, the entire contents of each of which are hereby incorporated by reference.

TECHNICAL FIELD

The present invention relates to a small-size antenna capable of being operated at UHF band or its surrounding frequency bands, and further to an RF tag comprising the small-size antenna and an IC chip connected to the antenna.

BACKGROUND ART

RF systems are capable of communicating a large amount of information data in a non-contact state and therefore have been used instead of bar code systems in the application fields such as accounting, prepayment, security management or control, article control or distribution control and traceability (Patent Document 1).

In the application fields of accounting, prepayment and security management, it is intended to restrict a communicable range of the RF systems in view of their configuration upon use. For this reason, in these application fields, there has been employed an electromagnetic induction system mainly using a frequency of 13.56 MHz or the like. On the other hand, in the application fields of article control or distribution control, traceability and the like, there has been used a radio wave system using a UHF band (840 to 958 MHz, 2.45 GHz) which is capable of remote communication at a distance of several meters or more. It is expected that in the future, the radio wave system will have a further progress.

An RF tag used in the RF system operated in a UHF band has such a structure that an IC chip for storing and processing data and an antenna for communicating the data with an outside are mounted on a flat thin base sheet formed of a resin, a paper or the like. The RF tag is attached to an article to be managed, and communicates necessary information data with a reader/writer using a radio wave.

The size of the antenna may be substantially determined according to a frequency used, i.e., a wavelength λ, of the radio wave. The tag used in a UHF band has a size of about 15 mm in length and about 145 mm in width. Therefore, the RF tag is necessarily incapable of being attached to a small article having a dimension smaller than the above size. As a result, such an RF tag can be used only in the limited applications. To solve the problems, there has been proposed an RF tag comprising a dipole antenna having a folded tip end in which an inductance portion is disposed (Patent Document 2).

Also, the RF tag is disposed close to or attached to a dielectric material such as a resin, a metal, a paper, water, etc., upon use. In this case, it is known that frequency characteristics of a feeding point impedance of the antenna are fluctuated so that reading characteristics of the RF tag are deteriorated. To solve this problem, there have been proposed the above method described in Patent Document 1 and a method using an antenna having such a configuration that the antenna is sandwiched between plastic materials (Patent Document 3).

On the other hand, a hexagonal ferrite has been proposed as a magnetic material that can be used in a UHF band (Patent Document 4).

PRIOR ART DOCUMENTS

Patent Documents

Patent Document 1: Japanese Patent Application Laid-open (Tokuhyo) No. 2008-511234
Patent Document 2: Japanese Patent Application Laid-open (KOKAI) No. 2007-295395
Patent Document 3: Japanese Patent Application Laid-open (KOKAI) No. 2005-165462
Patent Document 4: Japanese Patent Application Laid-open (KOKAI) No. 2003-243218

SUMMARY OF THE INVENTION

Problem to be Solved by the Invention

In the above Patent Document 2, it is described that the RF tag comprising a dipole antenna having a folded tip end in which an inductance portion is disposed can be miniaturized into a size of about 7 mm in length and about 53 mm in width. However, the RF tag is still unsatisfactory to meet the requirement of further reduction in size thereof.

In the above Patent Documents 1 to 3, there is described the method of suppressing fluctuation of frequency characteristics of the antenna when disposed close to or attached to a dielectric material such as a resin, a metal, a paper, water, etc. However, the method is still insufficient.

Also, when the conventional RF tag having a large size which further tends to suffer from deformation upon heating is mounted to a printed electronic circuit board, it was not possible to mount the RF tag to the board similarly to the other electronic parts by an ordinary method such as a reflow method in which the RF tag is fixed onto the board by soldering at a temperature of 180 to 260° C.

Further, when used under severe conditions such as high-temperature and high-humidity conditions and temperature cycle conditions, the conventional RF tag tends to suffer from the problem of a poor durability. Thus, the conventional RF tag has failed to exhibit an excellent environmental resistance and therefore can be used only in the limited applications.

Under these circumstances, an object of the present invention is to provide an antenna having a sufficiently small size as compared to the conventional antenna which is free from fluctuation in frequency characteristics even when disposed close to or attached to a dielectric material such as a resin, a metal, a paper, water, etc., can be mounted on a printed electronic circuit board similarly to the other electronic parts by an ordinary method such as a reflow method and therefore can be enhanced in productivity, and further can exhibit an excellent environmental resistance so as to be usable even under severe conditions, and an RF tag comprising the above antenna and an IC chip connected to the antenna.

Means for Solving the Problem

The above object or technical task of the present invention can be achieved by the following aspects of the present invention.

That is, in accordance with the present invention, there is provided a folded dipole antenna comprising a magnetic material in which a radiation element and a reflection element each having a folded dipole structure are disposed (Invention 1).

Also, according to the present invention, there is provided the folded dipole antenna as described in the above Invention 1, wherein the magnetic material comprises a hexagonal Z-type ferrite and/or a hexagonal Y-type ferrite as a main component (Invention 2).

In addition, according to the present invention, there is provided an RF tag comprising the folded dipole antenna as described in the above Invention 1 or 2, and an IC chip connected to the folded dipole antenna (Invention 3).

Further, according to the present invention, there is provided a resin-coated RF tag formed by coating the RF tag as described in the above Invention 3 with a resin (Invention 4).

Effect of the Invention

The folded dipole antenna according to the present invention has a smaller size than that of the conventional antennas. Therefore, the RF tag of the present invention which comprises the folded dipole antenna connected to an IC chip has a small size of about 5 mm in length and about 9 mm in width in minimum as compared to the conventional tag having a size of about 7 mm in length and about 53 mm in width as described in the above Patent Document 2, so that an area of an article to which the RF tag is to be attached can be considerably reduced. Further, frequency characteristics of a feeding point impedance of the antenna are substantially free from adverse influence by ambient environments. As a result, the RF tag can be attached to various articles selected from those used in extensive application fields, and can also be enhanced in communication reliability. For example, the RF tag may be attached to metals or articles having a high dielectric constant, in particular, can be mounted onto a printed electronic circuit board formed of a resin or a metal similarly to the other electronic parts. In this case, the RF tag can exhibit a high heat resistance and therefore can be mounted to the board similarly to the other electronic parts by an ordinary method such as a reflow method, resulting in enhancement in productivity thereof.

PREFERRED EMBODIMENTS FOR CARRYING OUT THE INVENTION

The construction of the present invention is described in more detail below.

When designing an antenna, it becomes important to take into account not only a directivity and a gain of the antenna but also a matching ability to external devices to be connected to the antenna. In general, in order to maximize an electric power exchanged between the antenna and an external device such as an IC chip, it is required to consist a feeding point impedance of the antenna with a complex conjugate of an input impedance of the external device. For example, when connecting a coaxial cable having a characteristic impedance of 50Ω to the antenna, the feeding point impedance of the antenna is adjusted to 50Ω as measured at a desired frequency. In addition, in the case where an IC chip is connected to the antenna as in an RF tag, the input impedance of the IC chip as measured at a dynamic frequency usually has a real number component of several Ω to several hundreds of Ω and an imaginary number component of –(minus) several Ω to –(minus) several thousands of Ω. Therefore, the feeding point impedance of the antenna is also controlled to have a real number component in the range of several Ω to several hundreds of Ω and an imaginary number component in the range of several Ω to several thousands of Ω in order to match with the input impedance of the IC chip.

Figure 1A:
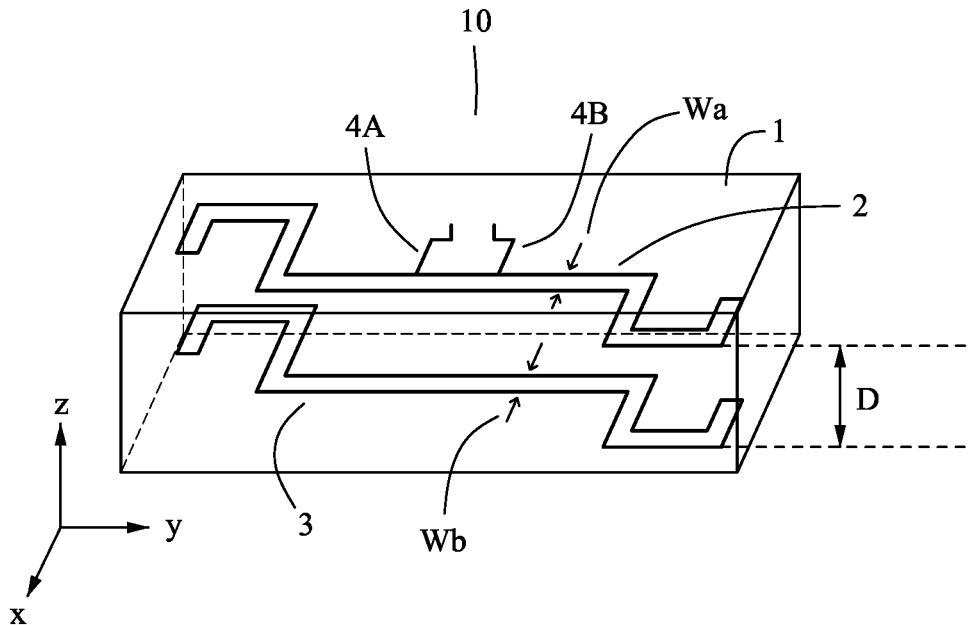
FIG. 1A is a perspective view schematically showing an embodiment of a folded dipole antenna according to the present invention.
Figure 1B:
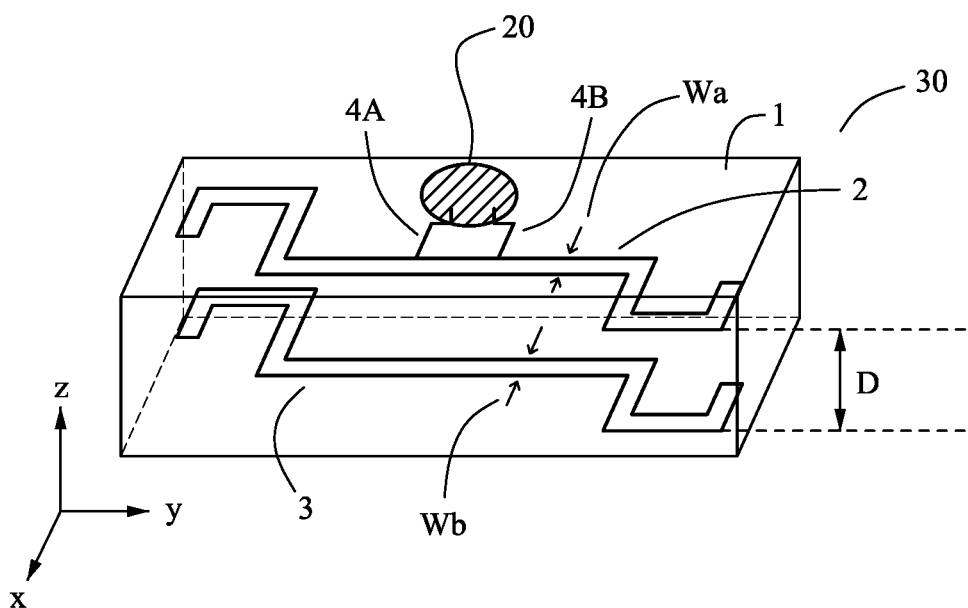
FIG. 1B is a perspective view schematically showing an embodiment of an RF Tag with an IC Chip.

A typical structure of the folded dipole antenna 10 according to the present invention is schematically shown in FIG. 1A. A typical structure of the RF Tag 30 with IC Chip 20 is schematically shown in FIG. 1B. A magnetic material 1 is provided therein with a radiation element 2 and a reflection element 3 which are disposed in substantially parallel with each other. These elements each have such a folded dipole structure that two parallel dipole elements are short-circuited at both ends thereof. The radiation element 2 is connected with matching circuits 4A and 4B. Respective opening ends of the matching circuits 4A and 4B are connected to terminals (not shown) for electrically connecting the folded dipole antenna 10 to an external device. In addition, for the sake of down-sizing, the radiation element 2 and the reflection element 3 respectively have such a structure that both ends thereof are folded. However, the both ends of each of the radiation element 2 and the reflection element 3 may extend straight without being folded if there is no limitation to an installation area for the antenna 10.

Also, although the dipole elements constituting the radiation element and the reflection element as shown in FIGS. 1A and 1B have the same size, these elements may have different sizes from each other.

The frequency used for the RF tag operated in a UHF band is, for example, 865 to 868 MHz in Europe, 902 to 928 MHz in USA and 950 to 958 MHz in Japan, and thus varies in respective countries. Therefore, in the present invention, by controlling a peripheral length La of the radiation element, a spacing Wa between respective dipole elements in the radiation element, a peripheral length Lb of the reflection element, a spacing Wb between respective dipole elements in the reflection element, a distance D between the radiation element and the reflection element which are substantially in parallel with each other, a magnetic permeability and a dielectric constant of a magnetic material, and the like, the feeding point impedance of the antenna is adjusted to a desired value in the above frequency range.

The peripheral length La of the radiation element is adjusted to be identical to a corresponding wavelength of the predetermined frequency. In this case, the wavelength is reduced by a magnetic permeability and a dielectric constant of the magnetic material. Since the size of the magnetic material is limited, effective magnetic permeability and dielectric constant of the antenna are smaller than those of the magnetic material itself. For this reason, in order to obtain a desired frequency for the RF tag, it is necessary to appropriately control sizes of the radiation element and the magnetic material.

The peripheral length La of the radiation element used in the present invention is preferably 25 to 130 mm. When the peripheral length La of the radiation element is less than 25 mm, the corresponding frequency tends to exceed 3 GHz, so that the antenna tends to suffer from large magnetic loss, resulting in deteriorated radiation efficiency of the antenna. When the peripheral length La of the radiation element is more than 130 mm, the corresponding frequency tends to be lower than 300 MHz. Therefore, there is no reason for using the magnetic material as defined in the present invention in place of a spinel type ferrite having µ' of not less than 10 in the frequency band. The peripheral length La of the radiation element is more preferably 30 to 120 mm.

The spacing Wa between the respective dipole elements in the radiation element as used in the present invention (Wa shown in FIGS. 1A & 1B) is preferably 0.5 to 2 mm. When the spacing Wa is less than 0.5 mm, the communication distance tends to be reduced owing to deterioration in radiation efficiency of the antenna. When the spacing Wa is more than 2 mm, it may be difficult to match the feeding point impedance of the antenna with a complex conjugate of the input impedance of the IC chip. The spacing Wa between the respective dipole elements in the radiation element is more preferably 0.5 to 1.5 mm.

In the present invention, in order to prevent reduction in communication distance even in the case where the antenna is attached to a metal, a dielectric material or the like, the reflection element is provided. The peripheral length Lb of the reflection element is preferably 30 to 140 mm. When the peripheral length Lb of the reflection element is out of the above-specified range, the antenna tends to be deteriorated in directivity, so that the communication distance of the antenna tends to be reduced. The peripheral length Lb of the reflection element is more preferably 35 to 130 mm.

In the present invention, the peripheral length La of the radiation element and the peripheral length Lb of the reflection element may be either identical to each other or different from each other. The ratio of La to Lb (La/Lb) is preferably 0.7 to 1.3 and more preferably 0.8 to 1.2.

The spacing Wb between the respective dipole elements in the reflection element (Wb shown in FIGS. 1A & 1B) is preferably 0.5 to 2 mm. When the spacing Wb is less than 0.5 mm, the communication distance tends to be reduced owing to deterioration in radiation efficiency of the antenna. When the spacing Wb is more than 2 mm, it may be difficult to match the feeding point impedance of the antenna with a complex conjugate of the input impedance of the IC chip. The spacing Wb between the respective dipole elements in the reflection element is more preferably 0.5 to 1.5 mm.

In the present invention, the spacing Wa between the respective dipole elements in the radiation element and the spacing Wb between the respective dipole elements in the reflection element may be either identical to each other or different from each other.

The distance D between the radiation element and the reflection element used in the present invention is preferably 1.5 to 13 mm. When the distance D is less than 1.5 mm, the communication distance tends to be reduced owing to deterioration in radiation efficiency of the antenna. When the distance D is more than 13 mm, the communication distance tends to be no longer increased, and therefore it is not necessary that the distance D is increased to such a value. The distance D between the radiation element and the reflection element is more preferably 2.0 to 12 mm.

When the radiation element and the reflection element used in the present invention are disposed as shown in FIGS. 1A & 1B, the directivity of the antenna in the +z direction is enhanced, so that a radio wave tends to be hardly radiated in the −z direction. Therefore, when the folded dipole antenna or RF tag according to the present invention is attached to a metal or a dielectric material such that a bottom surface of the reflection element side thereof is opposed to the metal or dielectric material, the characteristics of the antenna or RF tag are unlikely to suffer from adverse influence of the metal or dielectric material.

As described above, owing to the effect of reducing the wavelength by the magnetic material and the arrangement of the reflection element, the antenna of the present invention can achieve reduction in size and area to be attached with the RF tag as compared to those of the antenna used in the conventional flat-shaped RF tag, and can also possibly suppress deterioration in gain owing to the reduction in size. In addition, when the antenna is disposed close to or attached to a dielectric material, a metal, etc., frequency characteristics thereof undergo a less variation, so that it is possible to prevent reduction in communication distance of the antenna.

Next, the magnetic material used in the present invention is explained. In the conventional bar antenna for AM radios, etc., there has been used a spinel type ferrite such as Ni—Zn ferrite. However, the spinel type ferrite tends to be unusable in a UHF band because a magnetic loss of the ferrite tends to be increased when used in the UHF band. For this reason, in the present invention, there is used a magnetic material comprising as a main component, a hexagonal Z type ferrite and/or a hexagonal Y type ferrite which are in the form of a soft magnetic material and suffer from only a less magnetic loss in the UHF band.

The magnetic permeability of the magnetic material used in the present invention is controlled such that as measured at 953 MHz, a real number component µ' of the magnetic permeability is preferably 1.2 to 5, and an imaginary number component µ" thereof is preferably 0.05 to 1.3. When the magnetic permeability of the magnetic material is out of the above-specified range, the effect of reducing the wavelength tends to be hardly attained, or the magnetic loss of the antenna tends to be increased. The real number component µ' of the magnetic permeability of the magnetic material is more preferably 1.5 to 4.0, and the imaginary number component µ" of the magnetic permeability of the magnetic material is more preferably 0.07 to 1.0.

The dielectric constant of the magnetic material used in the present invention is controlled such that as measured at 953 MHz, a real number component ∈' of the dielectric constant is preferably 5 to 30, and an imaginary number component ∈" thereof is preferably not more than 0.8. When the dielectric constant of the magnetic material is out of the above-specified range, the effect of reducing the wavelength tends to be hardly attained, or the dielectric loss of the antenna tends to be increased. The real number component ∈' of the dielectric constant of the magnetic material is more preferably 7 to 25, and the imaginary number component ∈" of the dielectric constant of the magnetic material is more preferably not more than 0.5.

In the present invention, the change in feeding point impedance of the antenna due to ambient environments may be evaluated by comparing a feeding point impedance of the antenna disposed on a foamed polystyrene having a size of 10×5×3 cm with a feeding point impedance of the antenna contacted with a metal plate having a size of 10×5×0.2 cm. The rate of change in feeding point impedance of the folded dipole antenna according to the present invention is ±50% based on the feeding point impedance of the antenna as measured on the foamed polystyrene. When the rate of change in feeding point impedance of the folded dipole antenna is out of the above-specified range, the folded dipole antenna tends to be hardly functioned as an antenna. The rate of change in feeding point impedance of the folded dipole antenna is preferably ±30% and more preferably ±10%.

The shape of the folded dipole antenna according to the present invention is not particularly limited, and may be any of a triangular prism shape, a rectangular prism shape (including a cubic shape and a rectangular parallelopiped shape), a polygonal shape, a cylindrical shape, a triangular pyramid shape, a rectangular pyramid shape, a polygonal pyramid shape, a conical shape, an octahedral shape and a spherical shape. The folded dipole antenna according to the present invention which has a cubic shape or a rectangular parallelopiped shape has a size of 3 to 25 mm in length, 8 to 40 mm in width and 2 to 15 mm in thickness.

The folded dipole elements, matching circuits, conductor wires, terminals and the like as used in the present invention are respectively formed on a surface of the magnetic material or within the magnetic material by baking a paste containing a conductive material together with the magnetic material at the same time as described in the below-mentioned production method. Therefore, the thicknesses of the folded dipole elements, matching circuits, conductor wires, terminals and the like are respectively in the range of about 5 to about 30 µm, and the widths of the folded dipole elements, matching circuits, conductor wires and the like are respectively in the range of about 0.1 to about 1 mm.

The heat resistance of the folded dipole antenna or RF tag according to the present invention is evaluated from the rate of change in feeding point impedance of the folded dipole antenna or RF tag as measured before and after a heat treatment in which the folded dipole antenna or RF tag is held at 300° C. for 5 sec. The antenna or RF tag according to the present invention which is formed of a ceramic material sintered at a high temperature exhibits a rate of change in feeding point impedance of not more than ±10% and preferably not more than ±5% even after the heat treatment. Further, the folded dipole antenna or RF tag according to the present invention is also substantially free of change in appearance even after the heat treatment.

The RF tag according to the present invention may be coated with a resin. Examples of the resin include polystyrene, acrylonitrile styrene, acrylonitrile butadiene styrene, acrylic resins, polyethylene, polypropylene, polyamides, polyacetal, polycarbonates, vinyl chloride-based resins, modified polyphenylene ethers, polybutylene terephthalate and polyphenylene sulfide.

The RF tag according to the present invention comprises the above folded dipole antenna and an IC chip connected to the antenna. In the present invention, there is adopted such a configuration that the IC chip is mounted onto the folded dipole antenna. Alternatively, there may also be used such a configuration that the folded dipole antenna is connected through an electric circuit to the IC chip provided separately from the antenna.

In addition, the folded dipole antenna or RF tag according to the present invention may be fixed on a surface of a board such as a printed electronic circuit board through a bonding agent or an adhesive, or by soldering. Meanwhile, in the case where the folded dipole antenna or RF tag is fixed by soldering, a metal layer may be formed on a surface of the folded dipole antenna or RF tag to which the board is to be attached, in order to enhance adhesion therebetween. According to the present invention, the folded dipole antenna or RF tag can be mounted onto a printed electronic circuit board together with the other parts at the same time by an ordinary method generally used for mounting electronic parts onto the printed electronic circuit board. Therefore, the folded dipole antenna or RF tag according to the present invention has a high mass-productivity.

In particular, in the case of the reflow soldering method in which an object to be soldered is generally exposed to heat treatments including heating at 180° C. for 2 min, heating at 220° C. for 1 min and further heating at 260° C. for about 2 to 5 sec, the RF tag comprising the conventional resin tends to become unusable owing to deformation by heat thereof. On the other hand, the folded dipole antenna or RF tag according to the present invention is formed of a ceramic material sintered at a high temperature and therefore can exhibit a high heat resistance. As a result, the folded dipole antenna or RF tag according to the present invention is free from drawbacks such as deformation by heat in the reflow soldering process and therefore can be mounted onto the board similarly to ordinary electronic parts which results in high mass productivity.

The printed electronic circuit board is provided, on a surface thereof or inside thereof, with wirings or ground earth formed of a conductive material, and therefore has the same influence on the antenna or RF tag as that of metals. In the printed electronic circuit board onto which the folded dipole antenna or RF tag according to the present invention is mounted, the antenna has the above-mentioned structure. Therefore, the folded dipole antenna or RF tag according to the present invention is free from adverse influence of the metals.

The IC chip may be connected to the folded dipole antenna through an IC chip connecting terminal formed on the antenna. The connecting method is not particularly limited, and may be either wire-bonding connection or flip-chip connection. Alternatively, a board connecting terminal may be formed in the folded dipole antenna, whereas the IC chip may be mounted within the printed electronic circuit board and further a wiring connected to the IC chip may be formed therein, to connect the board connecting terminal of the antenna to the wiring within the printed electronic circuit board.

The terminals for connecting the folded dipole antenna or RF tag to an external device, such as the IC chip connecting terminals and board connecting terminals, as well as the metal layer for fixing the folded dipole antenna or RF tag to the printed electronic circuit board by soldering, may be plated with a metal in the form of a single layer structure or a multilayer structure to enhance a soldering wettability, a soldering corrosion/crack resistance, a mechanical strength and a bonding strength thereof. The metal used for the metal plating may be selected from those metal elements suitable for the aimed object, and is preferably selected from Ni, Sn, Au, Cu and the like.

The conventional RF tag may have such a configuration that an antenna is provided on a printed electronic circuit board, and an IC chip is connected to the antenna. In this case, it is required that the antenna is previously provided on the board. Therefore, the IC chip cannot be mounted onto the existing board to form an RF tag. In addition, the installation position of the IC chip on the board is considerably limited owing to a large size of the antenna. On the other hand, in the RF tag according to the present invention, the antenna and the IC chip are integrated together, and therefore the RF tag has a small size. As a result, the present invention has such an advantage that the RF tag can be mounted even in a small dead space on the existing board.

Next, the method for producing the folded dipole antenna according to the present invention is described.

The folded dipole antenna according to the present invention may be produced as follows. That is, a conductive paste is applied onto a green sheet formed of magnetic particles comprising a hexagonal Z type ferrite and/or a hexagonal Y type ferrite as a main component, a resin such as butyral and a plasticizer to form a radiation element, a reflection element, an electrode terminal, a matching circuit and the like thereon. These green sheets are laminated and pressed together to obtain a laminate, and the resulting laminate is cut into a desired size and then sintered at a temperature of 880 to 1050° C. for 1 to 20 hr, preferably for 1 to 10 hr to produce the folded dipole antenna.

The kind of conductive paste may be appropriately selected according to a sintering temperature used. For example, as the conductive paste, an Ag paste may be used at a sintering temperature of about 900° C., and a noble metal-containing Ag paste or a noble metal paste may be used at a sintering temperature of about 1000° C.

When the sintering temperature is less than 880° C., the sintered density tends to be lowered, so that the resulting sintered body tends to be deteriorated in mechanical strength. When the sintering temperature is more than 1050° C., the resulting sintered body tends to be deformed, so that it may be difficult to obtain a sintered body having a desired shape.

<Function>

The most important point of the present invention resides in such a fact that the folded dipole antenna comprising a ferrite having a less magnetic loss in a UHF band in which a radiation element and a reflection element each having a folded dipole structure are disposed, has a small size, and frequency characteristics of the antenna tend to be hardly adversely influenced by ambient environments. For this reason, the RF tag formed by connecting an IC chip to the above antenna can be attached to a small article to which the conventional RF tag can be hardly attached, and frequency characteristics of the RF tag also tend to be hardly adversely influenced by ambient environments. Therefore, the folded dipole antenna or the RF tag is enhanced in communication reliability. The folded dipole antenna or the RF tag according to the present invention has a high heat resistance, and therefore can be mounted similarly to the other electronic parts onto a printed electronic circuit board by an ordinary method such as a reflow soldering method which is generally used for mounting electronic parts onto the printed electronic circuit board. As a result, the folded dipole antenna or the RF tag according to the present invention has a high mass productivity, and can be used even under severe conditions and is therefore excellent in environmental resistance.

According to the present invention, by providing an antenna comprising a magnetic material in which a radiation element and a reflection element each having a folded dipole structure are disposed and controlling conditions for forming the radiation element and the reflection element as well as characteristics of the magnetic material and a size of the antenna, it is possible to obtain an antenna having a small attaching area and a small volume.

EXAMPLES

The present invention is described in more detail below by referring to the following Examples. However, the following Examples are only illustrative and not intended to limit the present invention thereto.

The magnetic permeability and the dielectric constant of the magnetic material were measured as follows. That is, a 2 mm-thick disk-shaped magnetic material which was baked simultaneously with the folded dipole antenna is cut into a ring-shaped core, and the thus obtained ring-shaped core was inserted into a coaxial tube, and the magnetic permeability and the dielectric constant thereof were measured using a network analyzer "N5230A" manufactured by Agilent Technology Co., Ltd.

The feeding point impedance of the folded dipole antenna was measured using a network analyzer "N5230A" manufactured by Agilent Technology Co., Ltd.

The communication distance of the RF tag comprising a folded dipole antenna and an IC chip connected to the antenna was measured by the following method. That is, the RF tag was placed on a foamed polystyrene, and by using a reader/writer unit "CR-900LJ-5-S4" manufactured by CDEX Co., Ltd., and an antenna unit "CA-900JC-4" manufactured by CDEX Co., Ltd., a distance capable of communicating between the RF tag and the reader/writer unit was measured. The maximum distance capable of communicating therebetween was defined as a communication distance of the RF tag.

The size of the folded dipole antenna was measured using a digital caliper manufactured by Mitsutoyo Corp. Upon the measurement, the longitudinal size, lateral size and thickness of the antenna were obtained from the dimensions in the x, y and z directions as shown in FIGS. 1A and 1B, respectively.

Example 1

Production of Folded Dipole Antenna

A green sheet (thickness: 85 μm) formed of magnetic particles comprising a Z type ferrite and a Y type ferrite as a main component, a butyral resin and a plasticizer was cut into a size of 160 mm in length and 160 mm in width, and an Ag paste was applied thereonto to print a wiring layer having a thickness of 20 μm such that a radiation element having a peripheral length La of 69 mm and a spacing Wa of 1 mm and a reflection element having a peripheral length Lb of 69 mm and a spacing Wb of 1 mm are formed therein, and a distance D between the radiation element and the reflection element was 7.3 mm. The green sheets were laminated and then pressed together under $350 \times 10^4$ kg/m² to obtain a green sheet laminate having a thickness of 9.8 mm. The thus obtained green sheet laminate was cut into a size of 13.3 mm in length and 24.8 mm in width, and sintered at 900° C. for 2 hr, thereby obtaining a folded dipole antenna having a size of 11.3 mm in length, 21.1 mm in width and 8.3 mm in height.

The impedance of the thus obtained folded dipole antenna as measured at 953 MHz had a real number component of 39.3 and an imaginary number component of 97.2, and the magnetic permeability of the disk-shaped magnetic material sintered simultaneously with the antenna as measured at 953 MHz had μ' of 2.2 and μ" of 0.11, and the dielectric constant thereof at 953 MHz ∈' of 14.5 and ∈" of 0.07. The rate of change in impedance of the resulting folded dipole antenna as measured at 953 MHz when contacted with a metal plate having a size of 10×5×0.2 cm was −1.0% for a real number component thereof and −0.8% for an imaginary number component thereof.

In addition, the rate of change in feeding point impedance of the folded dipole antenna as measured before and after being heat-treated at 300° C. for 5 sec was 0.8% for a real number component thereof and −0.2% for an imaginary number component thereof.

<Production of RF Tag>

The folded dipole antenna obtained by the above method was connected with an IC chip "Monza" produced by Impinj Inc., thereby obtaining an RF tag. The communication distance of the thus obtained RF tag was 41 cm.

Examples 2 to 6, 9 and 10

The same procedure as in Example 1 was conducted except that the magnetic permeability and dielectric constant of the magnetic material, the size of the antenna, the peripheral length La and spacing Wa of the radiation element, the peripheral length Lb and spacing Wb of the reflection element, the distance D between the radiation element and the reflection element, and the kind of IC chip were changed variously, thereby obtaining folded dipole antennas and RF tags. The production conditions and various properties of the thus obtained folded dipole antennas and RF tags are shown in Tables 1, 2 and 3.

Examples 7 and 8

The same procedure as in Example 1 was conducted except that no IC chip was mounted, thereby obtaining folded dipole antennas. The production conditions and various properties of the thus obtained folded dipole antennas are shown in Tables 1, 2 and 3. As recognized from Tables, the feeding point impedance of the respective antennas was close to 50Ω as measured at 725 MHz or 1025 MHz. Therefore, when feeding an electric power through a 50Ω feeder, the obtained folded dipole antennas could be operated as an antenna.

Example 11

The folded dipole antenna obtained in Example 1 was brought into contact with a dielectric body having a size of 10×5×0.1 cm ($\epsilon'=16$; $\epsilon''=0.01$) to measure a feeding point impedance thereof. As a result, the feeding point impedance of the folded dipole antenna had a real number component of 39.0 and an imaginary number component of 96.6. The rate of change in feeding point impedance of the folded dipole antenna based on a feeding point impedance thereof as measured on a foamed polystyrene was −0.8% for a real number component thereof and −0.6% for an imaginary number component thereof.

Comparative Example 1

The same procedure as in Example 1 was conducted except that no reflection element was disposed, thereby obtaining a folded dipole antenna and an RF tag. The production conditions and various properties of the thus obtained folded dipole antenna are shown in Tables 1, 2 and 3. As recognized from Tables, the feeding point impedance of the antenna was changed to a large extent when contacted with the metal, and therefore it was confirmed that the antenna was likely to be considerably influenced by ambient environments.

Comparative Example 2

Various properties of the conventional UHF band RF tag "Latica-label" having a resin base sheet (produced by Toppan Forms Co., Ltd.) are shown in Tables 1, 2 and 3. Meanwhile, upon measuring the feeding point impedance of the RF tag, the IC chip was dismounted from the RF tag. As recognized from Tables, the feeding point impedance of the antenna in the RF tag was changed to a large extent when contacted with the metal, and therefore it was confirmed that the antenna was likely to be considerably influenced by ambient environments.

In addition, when subjecting the antenna to heat treatment at 300° C. for 5 sec, the antenna suffered from considerable thermal deformation due to heat generated, so that it was impossible to measure a feeding point impedance thereof.

TABLE 1

| Examples and Comparative Examples | At 953 MHz | | | |
|---|---|---|---|---|
| | $\mu'$ | $\mu''$ | $\epsilon'$ | $\epsilon''$ |
| Example 1 | 2.2 | 0.11 | 14.5 | 0.07 |
| Example 2 | 1.6 | 0.08 | 14.1 | 0.06 |
| Example 3 | 3.3 | 0.21 | 17.1 | 0.10 |
| Example 4 | 2.0 | 0.10 | 23.6 | 0.37 |
| Example 5 | 1.5 | 0.08 | 9.0 | 0.04 |
| Example 6 | 3.8 | 0.48 | 22.0 | 0.11 |
| Example 7 | 2.0 | 0.10 | 23.6 | 0.37 |
| Example 8 | 2.2 | 0.11 | 14.5 | 0.07 |
| Example 9 | 2.0 | 0.10 | 23.6 | 0.37 |
| Example 10 | 2.2 | 0.11 | 14.5 | 0.07 |
| Comparative Example 1 | 2.2 | 0.11 | 14.5 | 0.07 |
| Comparative Example 2 | — | — | — | — |

| Examples and Comparative Examples | Size of antenna | | | Radiation element | |
|---|---|---|---|---|---|
| | Length [mm] | Width [mm] | Thickness [mm] | La [mm] | Wa [mm] |
| Example 1 | 11.3 | 21.1 | 8.3 | 69 | 1.0 |
| Example 2 | 14.3 | 25.8 | 3.5 | 79 | 1.5 |
| Example 3 | 7.0 | 13.5 | 5.3 | 44 | 0.7 |
| Example 4 | 8.6 | 16.4 | 6.5 | 54 | 0.5 |
| Example 5 | 17.5 | 33.5 | 11.4 | 110 | 1.0 |
| Example 6 | 5.3 | 8.9 | 3.4 | 33 | 1.0 |
| Example 7 | 10.5 | 19.8 | 7.6 | 65 | 1.0 |
| Example 8 | 9.3 | 18.0 | 5.5 | 59 | 1.0 |
| Example 9 | 10.2 | 19.0 | 7.2 | 57 | 1.0 |
| Example 10 | 12.8 | 22.5 | 7.9 | 70 | 1.0 |
| Comparative Example 1 | 11.8 | 21.5 | 8.7 | 71 | 1.0 |
| Comparative Example 2 | — | — | — | — | — |

| Examples and Comparative Examples | Reflection element | | Distance | Matching |
|---|---|---|---|---|
| | Lb [mm] | Wb [mm] | D [mm] | circuit |
| Example 1 | 69 | 1.0 | 7.3 | Mounted |
| Example 2 | 89 | 1.5 | 2.5 | Mounted |
| Example 3 | 39 | 0.7 | 4.5 | Mounted |
| Example 4 | 60 | 0.5 | 5.7 | Mounted |
| Example 5 | 121 | 1.0 | 11.5 | Mounted |
| Example 6 | 40 | 1.0 | 3.1 | Mounted |
| Example 7 | 71 | 1.0 | 6.5 | None |
| Example 8 | 63 | 1.0 | 4.5 | None |
| Example 9 | 53 | 1.0 | 5.9 | Mounted |
| Example 10 | 72 | 1.0 | 6.9 | Mounted |
| Comparative Example 1 | — | — | — | Mounted |
| Comparative Example 2 | — | — | — | — |

TABLE 2

| Examples and Comparative Examples | Frequency [MHz] | Feeding point impedance on foamed polystyrene | |
|---|---|---|---|
| | | Real number component [Ω] | Imaginary number component [Ω] |
| Example 1 | 953 | 39.3 | 97.2 |
| Example 2 | 953 | 38.7 | 92.1 |
| Example 3 | 953 | 40.9 | 90.1 |
| Example 4 | 953 | 12.5 | 140 |
| Example 5 | 953 | 13.8 | 138 |
| Example 6 | 953 | 41.2 | −8 |
| Example 7 | 725 | 53.8 | −0.9 |

TABLE 2-continued

| | | | |
|---|---|---|---|
| Example 8 | 1025 | 48.4 | −0.4 |
| Example 9 | 867 | 21.8 | 205.9 |
| Example 10 | 915 | 23.1 | 196.9 |
| Comparative Example 1 | 953 | 38.7 | 98.1 |
| Comparative Example 2 | 953 | 59.2 | 60.1 |

| | Feeding point impedance upon being contacted with metal | | Feeding point impedance after heat treatment | |
|---|---|---|---|---|
| Examples and Comparative Examples | Rate of change in real number component [%] | Rate of change in imaginary number component [%] | Rate of change in real number component [%] | Rate of change in imaginary number component [%] |
| Example 1 | −1.0 | −0.8 | 0.8 | −0.2 |
| Example 2 | −4.1 | −0.9 | −0.4 | 1.4 |
| Example 3 | 13.7 | 11.8 | 0.4 | 0.7 |
| Example 4 | −3.2 | −1.1 | 0.5 | 3.9 |
| Example 5 | −2.2 | 20.4 | −2.4 | −3.7 |
| Example 6 | −12.1 | −20.5 | 1.8 | 0.4 |
| Example 7 | 1.1 | −12.0 | −0.4 | 0.9 |
| Example 8 | 6.2 | 10.8 | 0.9 | 0.1 |
| Example 9 | 2.3 | 1.9 | 3.1 | −0.5 |
| Example 10 | −6.1 | 5.9 | 1.8 | −0.3 |
| Comparative Example 1 | −64.3 | −141.3 | 0.4 | 0.6 |
| Comparative Example 2 | −97.0 | 25.5 | — | — |

TABLE 3

| Examples and Comparative Examples | Kind of IC chip | Communication distance [cm] |
|---|---|---|
| Example 1 | Monza (Impinj) | 41 |
| Example 2 | Monza (Impinj) | 49 |
| Example 3 | Monza (Impinj) | 20 |
| Example 4 | Higgs2 (Alien) | 25 |
| Example 5 | Higgs2 (Alien) | 59 |
| Example 6 | Monza (Impinj) | 3 |
| Example 7 | — | — |
| Example 8 | — | — |
| Example 9 | G2XM (NXP) | 28 |
| Example 10 | G2XM (NXP) | 40 |
| Comparative Example 1 | Monza (Impinj) | 6 |
| Comparative Example 2 | — | 102 |

INDUSTRIAL APPLICABILITY

As apparently recognized from the results of the above Examples, the folded dipole antenna comprising a magnetic material in which a radiation element and a reflection element each having a folded dipole structure are disposed, has a small size as compared to the conventional antennas, and a feeding point impedance of the folded dipole antenna tends to be hardly adversely influenced by ambient environments. Therefore, the folded dipole antenna of the present invention can be suitably used as an antenna having an enhanced communication reliability.

The RF tag formed by connecting an IC chip to the above antenna has a small size as compared to the conventional RF tags and therefore can be reduced in its attaching area, and as a result, can be attached to a small article to which the conventional RF tags can be hardly attached. Also, since frequency characteristics of the RF tag are hardly adversely influenced by ambient environments, the RF system can be enhanced in reliability. Further, the folded dipole antenna or the RF tag has a high heat resistance, and therefore can be mounted similarly to the other electronic parts onto a printed electronic circuit board by an ordinary method such as a reflow soldering method which is generally used for mounting electronic parts onto the printed electronic circuit board. As a result, the folded dipole antenna or the RF tag can exhibit a high mass-productivity, and can be used even under severe conditions and is therefore excellent in environmental resistance.

EXPLANATION OF REFERENCE NUMERALS

1: Magnetic material; 2: Radiation element; 3: Reflection element; 4A: Matching circuit; 4B: Matching circuit; D: Distance between radiation element and reflection element; Wa, Wb: Spacing between dipole elements

The invention claimed is:

1. A folded dipole antenna comprising
a magnetic material and
only two dipole elements disposed in the magnetic material, wherein
the only two dipole elements disposed in the magnetic material consist of one radiation element and one reflection element,
the one radiation element has a folded dipole structure, and
the one reflection element has a folded dipole structure.

2. The folded dipole antenna according to claim 1, wherein the magnetic material comprises a hexagonal Z-type ferrite and/or a hexagonal Y-type ferrite as a main component.

3. The folded dipole antenna according to claim 1, wherein a rate of change in feeding point impedance of the folded dipole antenna is in a range of −50% to +50%, the rate of change in feeding point impedance of the folded dipole antenna being determined by comparing a first feeding point impedance of the folded dipole antenna when disposed on a foamed polystyrene having a size of 10×5×3 cm with a second feeding point impedance of the folded dipole antenna when contacted with a metal plate having a size of 10×5×0.2 cm.

4. The folded dipole antenna according to claim 3, wherein the rate of change in feeding point impedance of the folded dipole antenna is in the range of −30% to +30%.

5. The folded dipole antenna according to claim 3, wherein the rate of change in feeding point impedance of the folded dipole antenna is in the range of −10% to +10%.

6. The folded dipole antenna according to claim 1, wherein a rate of change in feeding point impedance of the folded dipole antenna is in a range of −10% to +10%, the rate of change in feeding point impedance of the folded dipole being determined by comparing a first feeding point impedance before a heat treatment in which the folded dipole antenna is held at 300° C. for 5 seconds with a second feeding point impedance after a heat treatment in which the folded dipole antenna is held at 300° C. for 5 seconds.

7. The folded dipole antenna according to claim 6, wherein the rate of change in feeding point impedance of the folded dipole antenna is in the range of −5% to +5%.

* * * * *